United States Patent
Vlutters et al.

(10) Patent No.: US 12,159,326 B2
(45) Date of Patent: Dec. 3, 2024

(54) PLANNING RADIATION THERAPY USING A PERSONALIZED HEMATOLOGIC RISK SCORE

(71) Applicant: KONINKLIJKE PHILIPS N.V., Eindhoven (NL)

(72) Inventors: Ruud Vlutters, Eindhoven (NL); Marinus Bastiaan Van Leeuwen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 348 days.

(21) Appl. No.: 17/782,642

(22) PCT Filed: Dec. 4, 2020

(86) PCT No.: PCT/EP2020/084572
§ 371 (c)(1),
(2) Date: Jun. 4, 2022

(87) PCT Pub. No.: WO2021/115941
PCT Pub. Date: Jun. 17, 2021

(65) Prior Publication Data
US 2023/0010980 A1   Jan. 12, 2023

(30) Foreign Application Priority Data
Dec. 12, 2019   (EP) ..................... 19215606

(51) Int. Cl.
*G06T 11/00* (2006.01)
*G06T 7/00* (2017.01)

(52) U.S. Cl.
CPC ............ *G06T 11/00* (2013.01); *G06T 7/0014* (2013.01); *G06T 2207/20084* (2013.01)

(58) Field of Classification Search
CPC ................... G06T 11/00; G06T 7/0014; G06T 2207/20084
See application file for complete search history.

(56) References Cited

U.S. PATENT DOCUMENTS

2022/0058801 A1* 2/2022 Klimov .................. G06V 10/20

OTHER PUBLICATIONS

PCT International Search Report, International application No. PCT/EP2020/084572, Feb. 9, 2021.
(Continued)

*Primary Examiner* — Christopher Wait
(74) *Attorney, Agent, or Firm* — Sherry Austin

(57) ABSTRACT

A process for converting an arbitrary input digital pathology image into an output digital pathology image that shares statistical information with a reference image. The input digital pathology image is separated into two or more image sections. Each image section is encoded, using a first convolutional neural network, into one or more feature maps. The one or more feature maps of each image section are modified based on statistical information derived from a reference image. The modified feature map(s) of each image section is/are then decoded to construct a respective image section for an output image. The constructed image sections for an output image then form the output image.

14 Claims, 3 Drawing Sheets

(56) References Cited

OTHER PUBLICATIONS

Yuan E. et al., "Neural Stain Normalization and Unsupervised Classification of Cell Nuclei in Histopathological Breast Cancer Images", arxiv.org, Cornell University Library, 201 Olin Library Cornell University Ithaca, NY 14853, Nov. 9, 2018, XP081048132.
Janowczyk A. et al., "Stain Normalization Using Sparse AutoEncoders (StaNoSA): Application to Digital Pathology", Computerized Medical Imaging and Graphics, Pergamon Press, New York, NY, US, vol. 57, May 16, 2016 (May 16, 2016), pp. 50-61, XP029988098.
Bug D. et al., "Context-Based Normalization of Histological Stains using Deep Convolutional Features", arxiv.org, Cornell University Library, 201 Olin Library Cornell University Ithaca, NY 14853, Aug. 14, 2017, XP080952769.
Reinhard et al., "Color Transfer Between Images", IEEE Computer Graphics and Applications, vol. 21, No. 4, Jan. 1, 2001, p. 34, XP055011470.
Simonyan K. et al., "Very Deep Convolutional Networks for Large-Scale Image Recognition", arXiv preprint arXiv:1409.1556, 2014. Computer Vision and Pattern Recognition (cs.CV).
Glatz-Krieger K. et al., "Factors to Keep in Mind When Introducing Virtual Microscopy", Virchows Archivives, vol. 448, pp. 248-255, 2006.
Riufrok A. C. et al., "Quantification of Histochemical Staining by Color Deconvolution", Analytical and Quantitative Cytology and Histology, vol. 23, No. 4, pp. 291-299, 2001.
Macenko M. et al., "A Method for Normalizing Histology Slides for Quantitative Analysis", Proceedings of the Sixth 2009 IEEE International Symposium on Biomedical Imaging: From Nano to Macro, pp. 1107-1110, 2009.
Khan A. M. et al., "A Nonlinear Mapping Approach to Stain Normalization in Digital Histopathology Images Using Image-Specific Color Deconvolution", IEEE Transactions on Biomedical Engineering, vol. 61, No. 6, pp. 1729-1738, Jun. 2014.
Goodfellow I. et al., "Generative Adversarial Networks", Communications of the ACM, vol. 63, No. 11, pp 139-144, Nov. 2020. https://arxiv.org/abs/1406.2661.
Cho H. et al., "Neural Stain-Style Transfer Learning Using GAN for Histopathological Images", JMLR: Workshop and Conference Proceedings 80, 2017. arXiv https://arxiv.org/abs/1710.08543, Oct. 2017.
LaFarge M. W. et al., "Domain-Adversarial Neural Networks to Address the Appearance Variability of Histopathology Images", MICCAI 2017 Workshop on Deep Learning in Medical Image Analysis Computer Vision and Pattern Recognition (cs.CV), arXiv https://arxiv.org/abs/1707.06183, Jul. 2017.
Zhu J.-Y. et al., "Unpaired Image-to-Image Translation Using Cycle-Consistent Adversarial Networks", Laboratory Investigation, vol. 00, pp. 1-9, Jan. 2016. www.laboratoryinvestigation.org.
Huang X. et al., "Arbitrary Style Transfer in Real-time with Adaptive Instance Normalization", ,Proceedings of the IEEE international conference on computer vision, pp. 1501-1510. 2017.
Yiyun L. et al., "Universal Style Transfer via Feature Transforms", NIPS'17: Proceedings of the 31st International Conference on Neural Information Processing Systems, Dec. 2017, pp. 385-395. https://arxiv.org/abs/1705.08086.
Ghiasi G. et al., "Exploring the Structure of a Real-Time, Arbitrary Neural Artistic Stylization Network", British Machine Vision Conference 2017, BMVC 2017, London, UK, Sep. 4-7, 2017. BMVA Press, 2017. https://arxiv.org/abs/1705.06830.

\* cited by examiner

PLANNING RADIATION THERAPY USING A PERSONALIZED HEMATOLOGIC RISK SCORE

CROSS-REFERENCE TO RELATED APPLICATIONS

This patent application claims the priority benefit under 35 U.S.C. § 371 of International Patent Application no. PCT/EP2020/084572, filed Dec. 4, 2020, which claims the benefit of European Patent Application No. EP19215606.5, filed on Dec. 12, 2019. These applications are hereby incorporated by reference herein in their entirety.

FIELD OF THE INVENTION

The present invention relates to the field of image processing, and in particular to methods of modifying an input image to share statistical information with a reference image.

BACKGROUND OF THE INVENTION

Pathology departments in hospitals have recently been transitioning towards the use of digital pathology methods, which means that image data (from a pathology exam) is becoming available in a digital form. The increasing availability of digital pathology images also enables algorithmic processing of pathology images to take place, for example, to automatically identify structures or features within a pathology image.

Pathology images are generated by mounting cell/tissue samples on a (glass) slide, staining the mounted cell/tissue samples and imaging the stained cell/tissue samples to generate pathology image data. Staining a cell/tissue sample is important to improve a contrast between different element/structures in the sample. Different types and/or intensities of stain could be used, which may vary between different pathology departments and/or pathologists.

In particular, different types/intensities of stain can affect style information, such as a color (i.e. hue, saturation and/or brightness), of the pathology image, meaning that there can be significant style variations between different (sets of) pathology images. Style variation in a pathology image can also be due to storage conditions of the sample and/or the process performed in preparing the sample.

One problem facing pathology image data is that clinicians, such as pathologists, typically prefer a particular style, such as a particular color or contrast, for their pathology images in order to improve the accuracy of their analysis of the cell/tissue sample. Similarly, algorithms for automatically processing a pathology image may be trained on a specific/limited set of sample images (which may have a particular appearance). The style variation can therefore reduce an accuracy of analyzing a cell/tissue sample.

There is therefore a need to enable regularization of digital pathology images, to mitigate the problem of style variation in such digital pathology images, which would aid a clinician and any algorithms when processing the images. This enables improvement to the consistency of assessing images.

Whilst a number of approaches for style regularization have historically been suggested, such as performing color deconvolution, there is a particular difficulty in regularizing a style of a digital pathology image due to its typically very large size (>100,000 pixels). This means that current methods of regularizing a style of a digital pathology image require substantial memory and/or processing power.

SUMMARY OF THE INVENTION

The invention is defined by the claims.

According to examples in accordance with an aspect of the invention, there is provided a non-transitory computer-readable storage medium storing instructions for carrying out, when executed by a processing system, a method of converting an input digital pathology image into an output digital pathology image based on statistical information of a reference image.

The method comprises: obtaining the input digital pathology image; dividing the input digital pathology image into two or more image sections; for each image section: performing an encoding process, using a first convolutional neural network that generates one or more feature maps, each feature map being for a respective channel, on the image section to generate one or more feature maps for the image section; modifying each feature map for the image section using statistical information derived from the reference image, wherein the statistical information represents the entire reference image; and performing a decoding process, using a second convolutional neural network, on the one or more modified feature maps to generate a modified image section; and generating an output digital pathology image using the modified two or more image sections.

The present invention relates to a concept of modifying an input digital pathology image to regularize the style of the input image with respect to a reference image. This is performed by modifying the input image based on statistical information with a reference image, e.g. so that the input image has similar statistical variation within the style of the image (i.e. between pixels of the image) as the reference image. The underlying concept of the present invention enables a tiling approach to be taken when modifying an input image, whilst still ensuring that the statistical information of the overall modified image reflects the statistical information of the overall reference image.

The style of an image may refer to any style information that affects the appearance of an image, such as color, contrast, sharpness, graining, color aberrations and the like.

The input image is divided or tiled into a plurality of image sections/portions. Each section is processed using statistical information representative of an entire reference image, resulting in each image section (and therefore the overall modified image) sharing statistical information with the reference image. In this way, the style of the input image is regularized, as the statistical information maps onto the color variation within the input image.

Each image section is processed by a first convolutional neural network to generate one or more feature maps. The first convolutional neural network is therefore an encoder that encodes an image section into one or more feature maps, i.e. into the feature space. The first convolutional neural network is designed to generate a same number of feature maps for each image section it processes. Each feature map represents a different (feature) channel. Channels are common between different image sections, so that each image section is encoded into pre-determined feature channels.

For example, the first convolutional neural network may generate two or more feature maps for an image section, including: a first feature map, a second feature map and so on. Each feature map for an image section effectively corresponds to (i.e. represents a same feature channel of) a feature map of each other image section, so that (for example) the first feature map of a first image section corresponds to the first feature map of a second image section and so on. This conceptually creates (across the two or more image sections) one or more sets of corresponding feature maps, each set of feature maps belonging to a different feature channel.

The one or more feature maps of each image section are then (statistically) modified using statistical information derived from a reference image.

The modified feature map(s), of each image section, are then appropriately decoded using a second convolutional neural network to construct a modified image section (for each image section). The modified image sections are then reassembled to generate the output digital pathology image, which is stylistically regularized with respect to a reference image.

The present invention provides a mechanism for processing extremely large input images, so that they share statistical information with a reference image, using a reduced processing power (through use of a tiling mechanism).

The statistical information derived from the reference image may be feature-space statistical information, i.e. information representing statistical information of an encoded reference image, and in particular to statistical information of/between different channels of an encoded reference image.

In some embodiments, the method further comprises obtaining second statistical information derived from the input digital pathology image and representing the entire input digital pathology image; and the step of modifying each feature map comprises modifying the feature map further using the second statistical information.

To aid in consistent regularization of the overall/entire input digital pathology image, (feature space) statistical information representing the overall input digital pathology image may be used during the modification of the feature maps. This embodiment reduces a visual tiling effect that may otherwise be present if the statistical information on the overall input digital pathology image is unused (i.e. if each tile or image section is modified without reference to the other image sections of the overall image).

Preferably, the second statistical information comprises different statistical information for each respective channel. Thus, the second statistical information may comprise feature-level statistical information, which feature-level statistical information is provided for the feature map produced by the first convolutional neural network (i.e. the encoding process).

The second statistical information may be obtained by: obtaining the input digital pathology image; obtaining two or more image sections from the input digital pathology image: performing an encoding process, using the first convolutional neural network, on each image section to generate one or more feature maps for each image section, each feature map being for a respective channel; and generating statistical information for each channel using the generated feature maps, to thereby generate the second statistical information for the entire input digital pathology image.

This approach results in the generation of statistical information at the feature-level that represents the overall input image. The step of obtaining two or more image sections may be identical to the step of dividing the input image into image sections (i.e. so the image sections together form the overall input image), or may comprise obtaining a subset of image sections from such a divided input image (i.e. so the image sections for generating second statistical information do not together form the overall input image, but can still be representative of the overall input image).

For the sake of clarity and distinguishment, the image sections used for generating the second statistical information could instead be labelled "second image sections".

Preferably, the second statistical information comprises: a mean and standard deviation, for each channel, representing the entire input digital pathology image; and/or covariance and/or cross-correlation data, between different channels, representing the entire input digital pathology image.

Generating statistical information for each channel using the generated feature maps may comprise comparing different feature maps within each image section (e.g. to generate covariance or cross-correlation data) and/or, for each channel, processing feature maps belonging to that channel to derive channel-specific statistical information, e.g. a mean value of values of feature maps belonging to the channel. The same approach may be used to generate the second statistical information.

The step of generating statistical information for each channel may comprise performing a running statistical analysis process on feature maps of that channel to generate the statistical information. The same approach may be used to generate the second statistical information.

Preferably, each image section has at least a width and a height dimension, wherein the width of each image section is equal in size to the width of each other image section and the height of each image section is equal in size to the height of each other image section. In other words, the size of each image section is preferably identical.

In some embodiments, each image section has at least a width and a height dimension and the reference image has at least a width and a height dimension, wherein the product of the size of the width and height dimension of any image section is less than the product of the size of the width and height dimension of the reference image.

In at least one embodiment, the first convolutional neural network (i.e. the encoding process) generates one or more feature maps that represent a style or color appearance of the image section. Suitable methods of generating feature maps that represent a color or style are well known in the art, and may be adapted for use in the present invention.

The second convolutional neural network may be trained to reverse the encoding process performed by the first convolutional neural network. In particular, the second convolutional network may be designed so that, if it processed the one or more feature maps generated by the first convolutional neural network, the original input image section would be effectively reconstructed, e.g. ±1% accuracy or error. This ensures that minimal (structural) information is lost during the conversion/regularization process.

The statistical information may comprise different statistical information for each feature map generated by the first convolutional neural network, i.e. for each channel. As previously explained, each feature map of an image section corresponds to a feature map of each other image section, thereby creating (across the image sections) one or more sets of corresponding feature maps. The statistical information may comprise different statistical information for each set of corresponding feature maps. This means that corresponding feature maps for different image sections are modified in a similar/same manner using the same statistical information.

In some embodiments, the statistical information comprises, for each feature map generated by the first convolutional neural network (i.e. each channel): a mean and standard deviation, for each channel, derived from the reference image and representing the entire reference image; and/or covariance and/or cross-correlation data, between different channels, derived from the reference image and representing the entire reference image.

The statistical information may be derived by: obtaining the reference image; obtaining two or more reference image sections from the reference image; performing an encoding process, using the first convolutional neural network, on each reference image section to generate one or more feature maps for each reference image section, each feature map being for a respective channel; and generating statistical information for each channel, to thereby generate statistical information representing the reference image.

In some embodiments, the step of obtaining the two or more reference image sections from the reference image comprises dividing the reference image into a set of three or more reference image section and selecting a subset of two or more reference image sections. The selected subset of two or more reference image sections may be selected based on the content of the reference image section, e.g. to drop any blank or non-tissue parts of the reference image. This embodiment helps save processing power.

The step of generating statistical information for corresponding feature maps may comprise performing a running statistical analysis process on feature maps of the channel to generate the statistical information.

In some embodiments, each image section and each feature map (for each image section) has at least a width and a height dimension, wherein: the magnitude of the width dimension of each feature map is no less than a sixteenth of the magnitude of the width dimension of the image section corresponding to the feature map; and/or the magnitude of the height dimension of each feature map is no less than a sixteenth of the magnitude of the height dimension of the image section corresponding to the feature map. This helps minimize the loss to structural information contained in the original image section is not lost when processing the image section whilst enabling suitable modification to the image section to map statistical information of the reference image onto the image section.

Preferably, the magnitude of the width dimension of each feature map is no less than an eighth of the magnitude of the width dimension of the image section and/or the magnitude of the height dimension of each feature map is no less than an eighth of the magnitude of the height dimension of the image section corresponding to the feature map.

The magnitude of the width/height dimension of each feature map is preferable no more than a half of the magnitude of the width/height dimension of the image section, and preferable no more than a third of the magnitude of the width/height dimension, and more preferably no more than a quarter of the magnitude of the width/height dimension.

In some embodiments, the representative size of each pixel of a feature map is no greater than 256 times the representative size of a pixel of the image section, even more preferably no greater than 64 times the representative size of a pixel the image section and even more preferably no greater than 16 times the representative size of a pixel of the image section.

In some embodiments, the representative size of each pixel of a feature map is no less than 4 times the representative size of a pixel of the image section, and more preferably no less than 16 times the representative size of the image section.

Any combination of the maximum and minimum relative representative sizes may be used, e.g. so that the representative size of a pixel of the feature map may range between 256 to 4 times, between 64 and 4 times, between 16 and 4 times, between 256 and 16 times, between 64 and 16 times or exactly 16 times the representative size of a pixel of the image section.

Here, the term "representative size" is used to refer to the real-life size/measurement (e.g. in $m^2$) that a pixel represents. Thus, for a 2D image section having a height four times larger than that of a feature map, and a width four time larger than that of the feature map, the representative size of each pixel of the image section is sixteen times smaller than the representative size of each pixel of the feature map.

The input digital pathology image may be an image obtained from a pathology examination of a subject. The present invention is particularly advantageous when used for pathology images (obtained during a pathology examination); as such images are typically very large and would otherwise require significant processing power to process.

According to examples in accordance with an aspect of the invention, there is provided a computer-implemented method of converting an input digital pathology image into an output digital pathology image based on statistical information of a reference image.

The computer-implemented method comprises: obtaining the input digital pathology image; dividing the input digital pathology image into two or more image sections; for each image section: performing an encoding process, using a first convolutional neural network that generates one or more feature maps, on the image section to generate one or more feature maps for the image section; modifying each feature map for the image section using statistical information derived from the reference image, wherein the statistical information represents the entire reference image; and performing a decoding process, using a second convolutional neural network, on the one or more modified feature maps to generate a modified image section; and generating an output digital pathology image using the modified two or more image sections, wherein each feature map for an image section corresponds to a feature map of each other image section.

According to examples in accordance with an aspect of the invention, there is provided a processing system for converting an input digital pathology image into an output digital pathology image based on statistical information of a reference image.

The processing system is adapted to: obtain the input digital pathology image; divide the input digital pathology image into two or more image sections; for each image section: perform an encoding process, using a first convolutional neural network that generates one or more feature maps, on the image section to generate one or more feature maps for the image section; modify each feature map for the image section using statistical information derived from a reference image, wherein the statistical information represents the entire reference image; and perform a decoding process, using a second convolutional neural network, on the one or more modified feature maps to generate a modified image section; and generate an output digital pathology image using the modified two or more image sections, wherein each feature map for an image section corresponds to a feature map of each other image section.

The input digital pathology image may be obtained from a storage, memory or database. The processing system may itself comprise one or more processors or controller for performing the relevant steps.

Some embodiments provide an image provision system, the image provision system comprising a processing system herein described and a user interface adapted to display the generated output digital pathology image, e.g. at a two-dimensional screen.

The method and/or the processing system may be appropriately adapted to carry out any process performed by the non-transitory computer readable medium (when it is executed by a processing system).

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
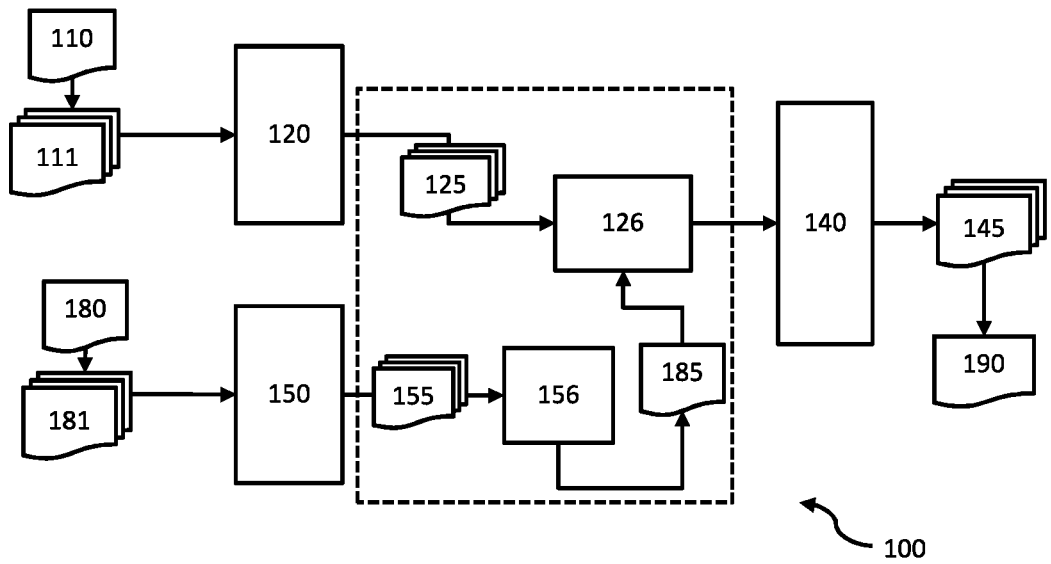
FIG. 1 conceptually illustrates a process of a method according an embodiment of the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

According to a concept of the invention, there is proposed a process for converting an arbitrary input digital pathology image into an output digital pathology image that shares statistical information with a reference image. The input digital pathology image is separated into two or more image sections. Each image section is encoded, using a first convolutional neural network, into one or more feature maps. The one or more feature maps of each image section are modified based on statistical information derived from a reference image. The modified feature map(s) of each image section is/are then decoded to construct a respective image section for an output image. The constructed image sections for an output image then form the output image.

The method effectively allows for a style transformation of an input digital pathology image (of an arbitrary style) to form an output digital pathology image that is stylistically similar, in a feature space, to a reference image.

Embodiments are at least partly based on the realization that a large image can be modified to statistically correspond, in a feature space, a reference image using a tiling regime, in which each tile (i.e. image section) is independent modified. The modification to the image section is performed by encoding the image section, modified the encoded image section, and decoding the modified image section. This means that the (visual) informational or structural content of the original input digital pathology image is retained, whilst modifying the style of the original input image.

Illustrative embodiments may, for example, be employed in pathology departments to modify digital pathology images to suit a clinician's needs or experience, e.g. based on a reference image for the clinician or department. This results in output digital pathology images being generated that assist a clinician in making a clinical decision.

Embodiments of the invention will be described with reference to processing a two-dimensional input image to generate a two-dimensional output image. However, embodiments may be expanded to include any size dimensional input/output images (e.g. a three-dimensional input image). Suitable methods of adapting the described processes/methods for three-dimensional images will be apparent to the skilled person. For example, where the images are three-dimensional, reference to a "pixel" may be replaced by reference to a "voxel". Relative sizes may be adjusted appropriately (e.g. something that is a quarter size in an 2D image may be an eighth size for a 3D image).

FIG. 1 conceptually illustrates a process 100 according to an embodiment of the invention. The process 100 is for converting an input digital pathology image 110 into an output digital pathology image 190 based on statistical information of a reference image 180.

The process 100 may be performed by a processing system when it executes instructions stored on a non-transitory computer-readable storage medium according to an embodiment of the invention. Thus, there may be non-transitory computer-readable storage medium storing instructions that, when executed by a processing system, cause the processing system to perform the process 100.

The process 100 comprises dividing the input digital pathology image 110 into a plurality of image sections 111. The input digital pathology image may be obtained from a database or other storage facility. Methods of dividing an image into a plurality of image sections are well known in the art and may comprise, for example, dividing an image into image sections of a predetermined size and/or shape.

Preferably, each image section is of an identical size and shape, e.g. a rectangle having a certain height and width. In such embodiments, padding may be added to the input image, if required, to appropriately size the input image (so that it can be divided into equal size image sections).

The size of each image section may be a standard size for processing by a convolutional neural network. Common sizes are 28×28 pixels, 256×256 pixels or 224×224 pixels, but other appropriate sizes are contemplated.

Each of the image sections 111 is then encoded by a first encoder 120. In particular, the first encoder 120 processes each image section using a first convolutional neural network to generate, for each image section, one or more feature maps 125. Thus, the first convolutional neural network receives, as input, an image section and provides, as output, one or more feature maps. The first convolutional neural network therefore encodes the image section.

The one or more feature maps together form a tensor. Each feature map represents or belongs to a different channel of the tensor. The feature maps are of identical size and/or shape to one another.

In particular examples, the first convolutional neural network (of the first encoder 120) generates one or more features maps each representing a style of the input image section. In other words, the encoder attempts to generate one or more feature maps that represent the stylistic content (i.e. the visual style or appearance), such as a color content, of the input image section, i.e. how the input image section "looks".

The style or stylistic content of an image may refer to any style information that affects the appearance of an image, such as color, contrast, sharpness, graining, color aberrations and the like.

A suitable example for the first convolutional neural network is the VGG-19 neural network, such as that first disclosed by Simonyan, K. and Zisserman, A., 2014. Very deep convolutional networks for large-scale image recognition. arXiv preprint arXiv:1409.1556. Other suitable neural networks for generating feature maps will be apparent to the skilled person.

Each feature map 125 is then processed by a processing module 126 using statistical information 185 (which is ultimately derived from the reference image 180). In particular, each feature map is processed to modify the statistical information of the feature map to more closely match that of the statistical information 185 derived from the reference image 180. The statistical information 185 is representative of the entire reference image (e.g. rather than a portion of the reference image). A suitable example of this process will be described later.

The modified feature map(s) are then decoded by a decoder 140. The decoder thereby generates a plurality of modified image sections 145. Each modified image section corresponds to a respective image section (as well as the feature map(s) generated using each image section and the modified feature map(s)).

The decoder 140 uses a second convolutional neural network to generate (using the modified feature map(s) associated with a particular image section) a modified image section. Thus, the second convolutional neural network receives, as input, one or more modified feature maps and provides, as output, a modified image section. The second convolutional neural network thereby decodes the one or more modified function maps into a modified image section. The second convolutional neural network may be considered a "deconvolutional" neural network.

The decoder 140 is preferably adapted to perform the reverse operation of the encoder 120. In other words, the second convolutional neural network preferably performs the reverse function of the first convolutional neural network. This embodiment improves the preservation of content information (i.e. the structure of features contained within an image) from the input image to the output image.

In particular, the second convolutional neural network may be adapted so that if it directly received, as input, the feature map(s) generated by the first convolutional neural network (by processing an "original" image section) it would generate, as output, an image section substantially identical (e.g. with ±1% error margin) to the original image section.

Methods of training a convolutional neural network to perform the reverse process of another convolutional neural network are well known in the art. The combination of a convolutional neural network (such as an encoder) and its reverse (such as a decoder) may be referred to as an "auto-encoder".

Typically, such methods comprise obtaining a training dataset, comprising training data entries, formed of training input data entries and training output data entries. An initialized convolutional neural network is applied to each training input data entry to generate predicted output data entries. An error, e.g. mean-squared difference, between the predicted output data entries and the corresponding training output data entries is used to modify the convolutional neural network. This process can be repeated until the error converges, and the predicted output data entries are sufficiently similar (e.g. ±1%) to the training output data entries. This is commonly known as a supervised learning technique.

In this case, for training the second convolutional neural network, each training output data entry comprises an image section and each training input data entry comprises one or more feature maps generated by the first convolutional neural network processing the corresponding image section. The predicted output data entries aim to be a reconstruction of the example input image section Turning back to FIG. 1, the modified image sections 145 are then reconstructed to form the output digital pathology image 190.

Thus, the output digital pathology image 190 comprises the information or structural content of the input digital pathology image, but is transformed in the feature space to be stylistically similar to the reference image. This is achieved by using the statistical information of the reference image to modify encoded portions/sections of the input image. The statistical information of the reference image comprises feature-level statistical information of the reference image.

FIG. 1 also conceptually illustrates a method of generating statistical information of the reference image. It should be appreciated that the statistical information represents the overall reference image (e.g. rather than a portion of the reference image).

The reference image 180 is divided into a plurality of reference image sections 181. This step may not be necessary if the reference image of a suitably small size (i.e. can itself act as a reference image section). Each reference image section is then encoded using a second encoder 150 to generate one or more reference feature maps 155.

The second encoder may perform the encoding of the reference image section using the same first convolutional neural network used by the first encoder 120. In some examples, the first encoder is adapted to perform the operation of the second processor.

In this way, each feature map 155 generated by the second encoder corresponds to a feature map 125 generated by the first encoder, i.e. belongs to a same channel as a feature map from the first encoder.

A processing module 156 then processes the reference feature map(s) from each image section in order to generate the statistical information 185. This may comprise, for example, determining a mean and/or standard deviation of feature maps that correspond to one another across different image sections (i.e. correspond to or belong to a same channel). This may be calculated, for example, by calculating a cumulative average (as the feature map(s) of each image section is processed) and/or using an incremental algorithm. A suitable embodiment of this process will be later described.

In some examples, the statistical information may comprise cross-correlation information (between feature channels) of the combination of all feature maps of all reference image sections.

In this way, statistical information of the overall reference image (within the feature space) can be generated.

From the foregoing, it will be apparent that the statistical information of the overall reference image is feature space statistical information of the overall reference image.

The modified image sections may be themselves used as an input for an automated processing technique for identifying information of the input image, e.g. automatic segmentation and/or annotation of the input image 110.

Figure 2:
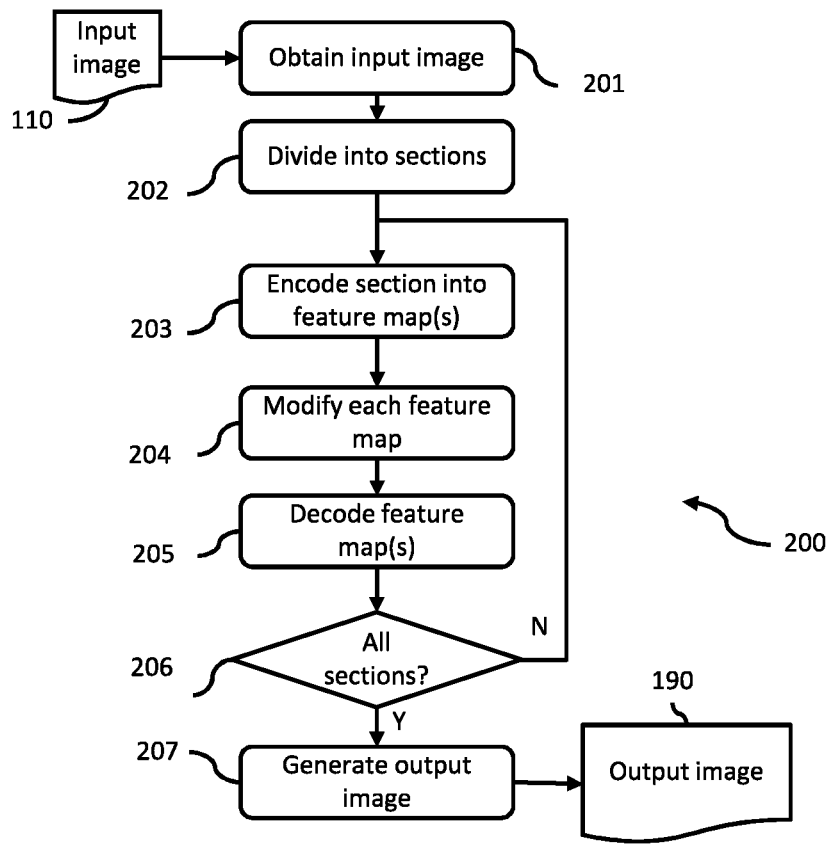
FIG. 2 is a flow-chart illustrating a method according to an embodiment of the invention.

FIG. 2 is a flow chart illustrating a method 200 according to an embodiment of the invention. The method 200 is computer-implemented, i.e. is designed to be carried out by a computer or processing system.

The method 200 comprises a step 201 of obtaining an input digital pathology image 110. The input digital pathology image may be obtained from a database or other storage facility (not shown).

In some embodiments, the obtained input digital pathology image may be selected by a user (e.g. in response to a user input received at a user interface). This may allow, for example, a user to browse available input digital pathology images and select one for viewing.

The method comprises a step 202 of dividing the input digital pathology image 110 into two or more image sections.

For each image section, the method performs a step 203 of performing an encoding process, using a first convolutional neural network that generates one or more feature maps (i.e. a tensor), on the image section to generate one or more feature maps for the image section; a step 204 of modifying each feature map for the image section using statistical information derived from the reference image, wherein the statistical information represents the entire reference image; and a step 205 of performing a decoding process, using a second convolutional neural network, on the one or more modified feature maps to generate a modified image section.

Modifying each feature map of an image section may be performed independently or simultaneously (e.g. by modifying a tensor formed of a plurality of stacked feature maps).

Steps 203 to 205 are repeated for each image section. A determination step 206 determines whether all image sections have undergone the steps 203 to 205. If not all image sections have been appropriately processed, steps 203 to 205 are repeated for an unprocessed image section.

If all image sections have undergone the steps 203 to 205, a step 207 is performed, wherein step 207 comprises generating an output digital pathology image 190 using the modified two or more image sections.

The output digital pathology image 190 may be displayed, for example, at a user interface. This may be performed subsequently to step 207 (in an unseen step).

In the method 200, each feature map for an image section belongs to a same channel as a feature map of each other image section, where each feature map of an image section belongs to a different channel. Thus, the feature maps for each image section correspond to features maps of each other image section.

The method 200 is a working method for generating an output image that carries out the process 100 described with reference to FIG. 1.

As previously described, the aim of the present invention is to modify the "look", style or appearance of an input digital pathology image whilst preserving the information content (i.e. the substantive information) of the input digital pathology image.

One potentially important element to preserving the information content of the original input digital pathology image concerns the properties of the feature maps (generated from the image section) that are modified using the statistical information of the reference image.

Generally speaking, a convolutional neural network processes an input image through a series of layers, each layer representing a processing step of the convolutional neural network, wherein each layer outputs a feature map which is provided as input to a subsequent layer. Example layers include pooling and convolutional layers.

Each layer reduces the original information content of the input image (e.g. as a pooling layer will effectively combine pixels, and a convolution layer effectively "blurs" neighboring pixels). Thus, when the output image is generated from the modified image sections, some original information may be lost (e.g. the distinction or contrast between neighboring pixels or groups of pixels may be less apparent).

To ensure that sufficient information content is maintained (in the output image) from the input image, it is preferred to limit the number of layers (of the first convolutional neural network) that sequentially process the input image.

However, using an insufficient number of layers may result in a failure to correctly modify a style of the input image (in the output image). This is because the input image may be insufficiently mapped into the feature space to be able to extract or modify style information of the input image.

Controlling the number of layers can be achieved by limiting a minimum/maximum size of the feature maps that are then modified (in step 204 of method 200), i.e. thereby limiting the number of pooling operations that can be performed and/or the maximum size of a stride of a filter in a convolutional layer.

In one embodiment, each image section and each feature map (for each image section) has at least a width and a height dimension. Preferably, the magnitude of the width dimension of each feature map is no less than a sixteenth, more preferable an eighth, of the magnitude of the width dimension of the image section corresponding to the feature map; and/or the magnitude of the height dimension of each feature map is no less than a quarter more preferable an eighth, of the magnitude of the height dimension of the image section corresponding to the feature map.

Preferably, the size of each feature map (i.e. the total number of pixels/voxels of a feature map) is between a fifth and a third of the size of the corresponding image section.

Figure 3:
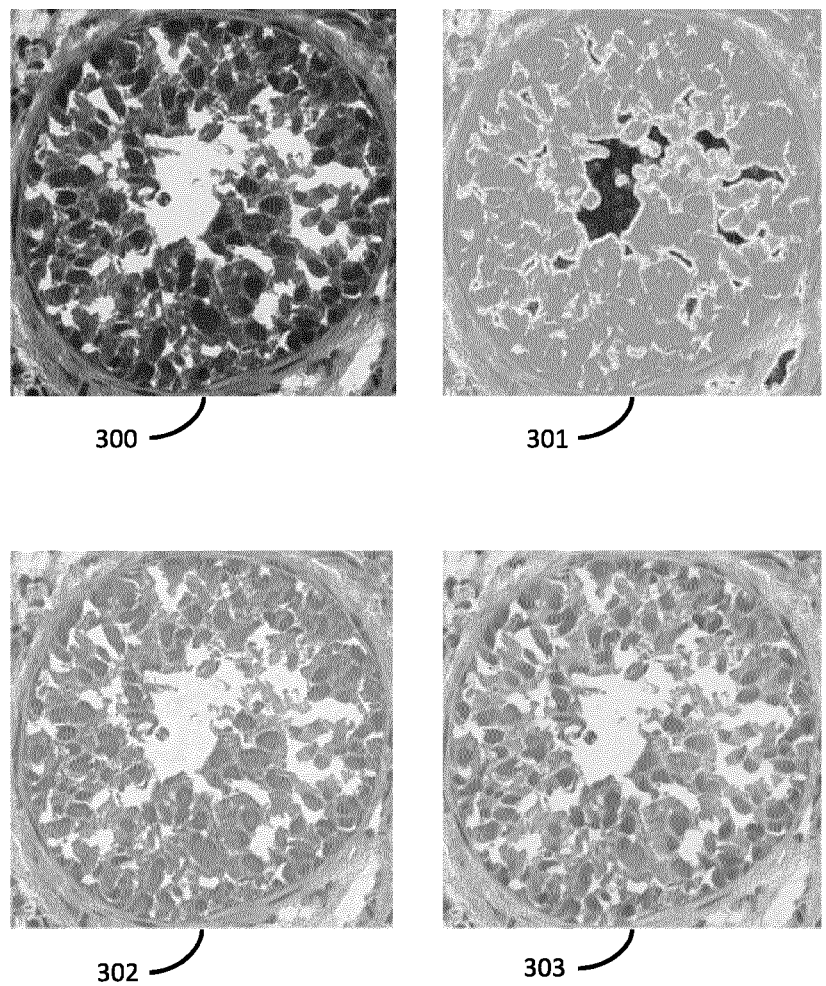
FIG. 3 is a diagram illustrating the effect of adjusting the relative size of feature map compared to the image section.

FIG. 3 illustrates the consequence of using different sizes of feature maps for modification.

FIG. 3 illustrates an example input image 300.

A first example output image 301 demonstrates an output image when the feature maps (which are modified using statistical information) are only ½ the size of image sections into which the input image is divided. It can be seen that, whilst there is a high preservation of information content, the style of the first example output image has not been fully modified to match the style of a reference image (i.e. some areas have not been modified, or have been incorrectly modified).

A second example output image 302 demonstrates an output image when the feature maps (which are modified using statistical information) are a quarter the size of image sections into which the input image is divided. It can be seen that, there is still a high preservation of information content from the input image, but the style of the second example output image more closely matches a reference image.

A third example output image 303 demonstrates an output image when the feature maps (which are modified using statistical information) are an eighth the size of image sections into which the input image is divided. It can be seen that, there is a loss of information content from the input image, but the style of the third example output image does even more closely match a reference image.

Limiting the size of the feature maps to lie between a fifth and a third of the size of the image section has been identified as being a good compromise in preserving information content of the original input image, whilst ensuring that a style transformation of the input image (to more closely match a reference image) can take place.

Other methods of limiting the number of layers of the first convolutional neural network would be apparent to the skilled person, e.g. by directly limiting the number of layers to a predetermined maximum (e.g. a maximum of 8 layers or a maximum of 6 layers). Other examples may comprise limiting the number of convolutional layers and/or pooling layers (e.g. a maximum of 4/6 convolutional and/or a maximum of 2/4 pooling layers). In some embodiments, the maximum number of convolutional layers may depend upon the properties of the convolutional layer (e.g. the size/stride of a filter of each convolutional layer).

If a VGG-19 neural network is used as the first convolutional neural network, then it is preferable that the feature maps generated by the "block2_pool" encoding layer are used. This corresponds to a feature map generated after 4 convolutional layers and 2 pooling layers have processed the image section, and in particular, in a specific order of: 2 convolutional layers, 1 pooling layer, 2 convolutional layers, 1 pooling layer.

In some embodiments, the representative size of each pixel of a feature map is no greater than 256 times the representative size of a pixel of the image section, even more preferably no greater than 64 times the representative size of a pixel the image section and even more preferably no greater than 16 times the representative size of a pixel of the image section.

In some embodiments, the representative size of each pixel of a feature map is no less than 4 times the representative size of a pixel of the image section, and more preferably no less than 16 times the representative size of the image section.

Any combination of the maximum and minimum relative representative sizes may be used, e.g. so that the representative size of a pixel of the feature map may range between 256 to 4 times, between 64 and 4 times, between 16 and 4 times, between 256 and 16 times, between 64 and 16 times or exactly 16 times the representative size of a pixel of the image section.

Here, the term "representative size" is used to refer to the real-life size/measurement (e.g. in $m^2$) that a pixel represents. Thus, for an image section having a height four times larger than that of a feature map, and a width four time larger than that of the feature map, the representative size of each pixel of the image section is sixteen times smaller than the representative size of each pixel of the feature map.

Figure 4:
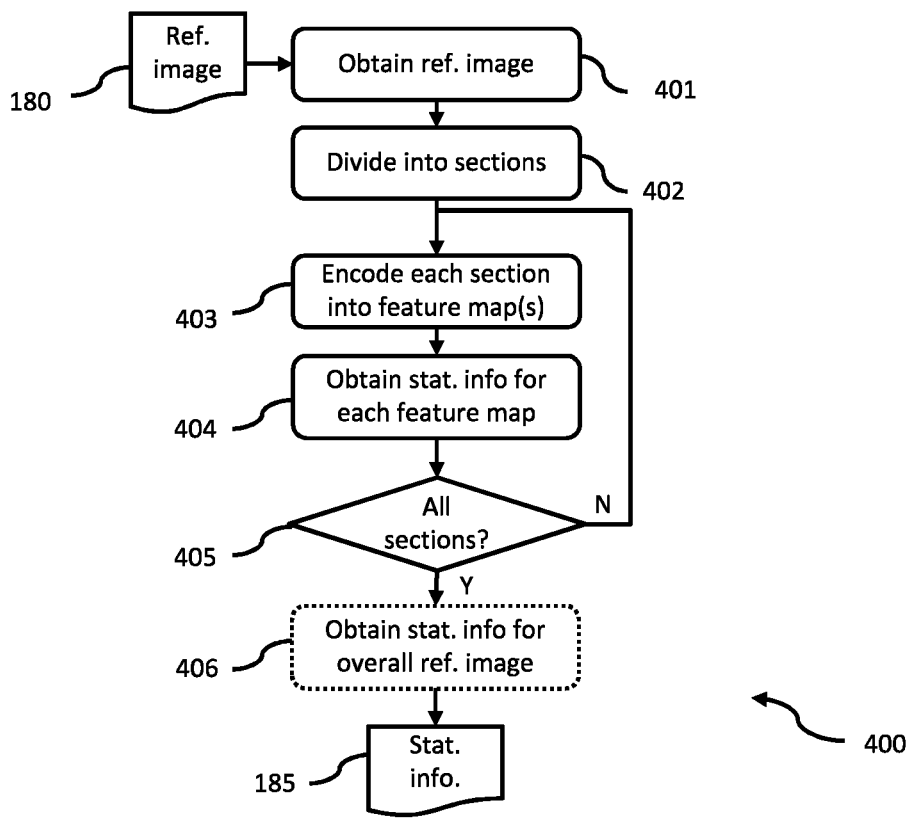
FIG. 4 is a diagram illustrating a method of generating statistical information for use in an embodiment of the invention.

FIG. 4 illustrates a method 400 of generating statistical information 185 for modifying a feature map/maps generated by the first convolutional neural network. A specific embodiment of modifying the feature map(s) will be described with reference to this statistical information.

As will be later described, the method 400 can be appropriately adapted for generating second statistical information that can be used to modify the feature map(s), where the second statistical information represents the entire input image.

The method 400 comprises a step 401 of obtaining the reference image. The reference image may be obtained from a database or other storage facility.

In some embodiments, the obtained reference image may be selected by a user (e.g. in response to a user input). In other embodiments, the obtained reference image may be obtained automatically based on information of the user or a location in which the method is performed. For example, a certain department, hospital or user may have predetermined reference images that are used in the proposed method. In other words, external information may be used to influence the selection of the reference image.

The method 400 also comprises a step 402 of dividing the reference image into two or more reference image sections. The size of each reference image section may be the same, for example, as the size of each image section generated by method 300 (described in FIG. 3).

Each image section is then processed using steps 403 and 404.

Step 403 comprises performing an encoding process (using the first convolutional neural network) on a reference image section to generate one or more feature maps (i.e. a tensor) for each reference image section. Each feature map of each reference image section belongs to a same channel as a feature map of every other reference image section, with each feature map of a reference image section belonging to a different channel. As the first convolutional neural network is used, each feature map of each reference image section belongs to a same channel as a feature map of each image section (generated in the method 300).

Each feature map, generated in step 403, is considered to belong to a specific channel. Put another way, each feature map belongs to a respective set of features maps, where each set of feature maps conceptually comprises corresponding feature maps associated with different reference image sections. Each set of feature maps can be considered to be a feature-space representation of the overall reference image.

By way of example, consider a scenario in which a first convolutional neural network produces a first and second feature map for a reference image section. The first feature maps of all the reference image sections form a first set of feature maps, i.e. belong to a first (feature) channel (which together represent a feature-space transformation of the overall reference image). The second feature maps of all the reference image sections form a second set of feature maps, i.e. belong to a second (feature) channel.

Step 404 preferably comprises generating statistical information for each feature map, i.e. each feature channel. Thus, if the one or more feature maps are together considered to form a tensor (having at least dimensions C×H×W, or channel by height by width), step 404 may comprise generating statistical information in the x-y plane of the tensor (i.e. in the H×W plane for each channel C).

The statistical information for each feature map may be used to later generate statistical information for a set of feature maps or feature channel (i.e. feature-space statistical information of an overall reference image). In other words, the statistical information may be used to generate feature channel specific statistical information.

A step 405 comprises determining whether all reference image sections have been processed in steps 403 and 404. In response to not all reference image sections having been processed, the next unprocessed reference image section is processed using the steps 403 and 404.

In response to determining that all reference image sections have been processed (i.e. statistical information has been generated for each feature map of each reference image section), the process moves to step 406.

Step 406 comprises generating statistical information for the overall reference image using the statistical information generated for each feature map in step 404. This may comprise generating statistical information for each set of feature maps (i.e. each feature channel), thereby generating feature-space information for the overall reference image.

By way of example only, the statistical information generated in step 404 may comprises generating a mean value for each feature map. An overall mean value (i.e. representing the overall reference image) for each set of feature maps (i.e. each channel) may be generated by averaging the mean value for each feature map belonging to that set.

In preferable embodiments, step 406 is (at least partially) integrated into step 404, so that step 404 comprises generating a running total of the statistical information as each reference image section is processed.

By way of example, step 404 may comprise, for each feature map, adding the mean value of that feature map to a cumulative sum (for the corresponding set of feature maps or channel). Step 406 may then comprise generating a mean value for each channel by dividing the final cumulative sum by the total number of reference image sections. The total number of reference image sections could be calculated by incrementing a counter, in step 404, each time a new mean value is added to the cumulative sum.

In some embodiments, step 406 is omitted entirely (i.e. is fully incorporated into step 404), so that the statistical information is generated by performing a running total of the statistical information, e.g. continually averaging the cumulative sum over time.

Of course, the cumulative sum (and optional counter) is initialized to 0 before the first reference image section is processed by a step 403.

Calculating the standard deviation of feature maps within a particular channel could be performed in a similar manner, for example, using Welford's algorithm or the related weighted incremental algorithm to calculate the standard deviation.

For instance, using the weighted incremental algorithm, this would result in the following calculations being performed at each step 404, for each feature map.

$$W_{sum} = W_{sum} + H * W \quad (1)$$

$$Zsum_c = Zsum_c + \sum_{h=1}^{H}\sum_{w=1}^{W} Z_{hwc}$$

$$Z2sum_c = Z2sum_c + \sum_{h=1}^{H}\sum_{w=1}^{W} [Z_{hwc}]^2$$

where Z represents a value of a pixel of the feature map, h represents the height position of the pixel within the feature map (e.g. a column position), with H representing the maximum height position (i.e. the height of the feature map), w represents the width positon of the pixel within the feature map (e.g. a row position), with W representing the maximum width position (i.e. the width of the feature map), and c represents the channel of the feature map (i.e. the set of feature maps to which the feature map belongs).

Each of $W_{sum}$, $Zsum_c$ and $Z2sum_c$ is initialized to 0 before the first reference image section is processed by a step 403.

Equation (1) may be repeated for each feature map of the image section, wherein there is an instance of each of $W_{sum}$, $Zsum_c$ and $Z2sum_c$ provided for each set of feature maps (i.e. each channel).

The standard deviation $\sigma_c^s$ of the overall set of feature maps, i.e. the particular channel c, can then be calculated, e.g. in step 406, using the following equation:

$$\sigma_c^s = \sqrt{\left(\frac{Z2sum_c}{Wsum}\right) - \left(\frac{Z2sum_c}{Wsum}\right)^2} \quad (2)$$

Equation (2) can be repeated for each set of feature maps (i.e. each channel). Of course, the mean $\mu_c^s$ could be readily calculated using the following equation:

$$\mu_c^s = \frac{Zsum_c}{Wsum} \quad (3)$$

In this way, statistical information can be generated for each set of feature maps, thereby generating statistical information that represents the overall reference image, wherein statistical information is generated for each feature channel.

The equations (1), (2) and (3) may be appropriately modified to calculate statistical information of the overall input digital pathology image, i.e. "second statistical information", for example to generate a mean $\mu_i$ of each set of feature maps for the input digital pathology image, i.e. a "whole image mean", and/or a standard deviation $\sigma_i$ of each set of feature maps for the input digital pathology image, i.e. a "whole image standard deviation". This could be performed by appropriately replacing any previous reference to a reference image or reference image section with the input digital pathology image or image section where appropriate.

This second statistical information may assist in the step of modifying the feature map(s) of each image section to generate the modified feature maps (used to generate the output digital pathology image).

In other words, second statistical information may be generated representing the entire input digital pathology image. The second statistical information is effectively feature-space statistical information of the input digital pathology image.

The statistical information and the second statistical information can be used to appropriately modify the feature map(s) generated for each image section during the method 200 (i.e. the image sections of the input digital pathology image).

For example, a modified feature map $F_m$ may be generated using the following equation:

$$F_m = \sigma_c^s \frac{F_i - \mu_i}{\sigma_i} + \mu_c^s \quad (4)$$

where $F_i$ represents the unmodified feature map.

Performing this step on each feature map effectively causes the first and second order statistics of the feature maps generated from the reference image to be transferred to each of the feature maps generated from the input image. In this way, the style of the reference image is effectively transferred in the feature space to the image sections of the input image.

In other words, statistical information is transferred to the input digital pathology image at the feature map level of the input digital pathology image (i.e. in feature space).

Starting from an image section ($X_i$), the total transform (to a modified image section $X_0$) can be written as:

$$X_o = D\left(\sigma_c^s \frac{E(X_i) - \mu_F}{\sigma_F} + \mu_c^s\right) \quad (5)$$

where E is the encoding process (i.e. processing with the first convolutional neural network) and D is the decoding process (i.e. processing with the second convolutional neural network). $E(X_i)$ forms a tensor, being a stacked set of one or more feature maps. $\mu_F$ is a vector of one or more entries, for which each entry is a mean value of all feature maps of a different channel (associated with the overall input image). $\sigma_F$ is a vector of one or more entries, for which each entry is a standard deviation of values of all feature maps of a different channel (associated with the overall input image). Each channel is represented in these two vectors, so that the number of entries in each vector is equal to the number of feature maps generated when processing an image section with a first convolutional neural network (i.e. the number of channels). $\mu_F$ and $\sigma_F$ thereby represent the overall image (rather than just the image section).

The statistical information of the reference image (and the second statistical information of the input digital pathology image, where relevant) parameters can be pre-computed and centrally stored. This calculation can be triggered as part of an automated processing workflow.

In some embodiments, instead of processing the whole reference image (and/or input digital pathology image) to generate statistical information (and/or the second statistical information), it is possible to limit the analysis to only a subset of (reference) image sections in order to save processing power. The subset of (reference) image sections could be selected based on the content of the (reference) image section, e.g. ignoring "non-tissue" image sections of an image, or by analyzing only a limited fixed number (or fixed percentage) of (reference) image sections at randomly sampled locations or on uniformly spaced locations of the overall image. Other methods would be appreciated by the skilled person.

Other statistical information than the mean and standard deviation could be transferred from the reference image to the input digital pathology image at the feature map level. For example, cross-correlation between feature channels (i.e. between different feature maps) could be transferred. The skilled person would be capable of adapting previously described concepts to transfer other statistical information to the input image at the feature map level.

In previously described embodiments, the statistical information is generated from a single reference image. However, in some embodiments, one could aggregate statistical information from several reference images. This could be performed by adapting previously described methods for calculating statistical information using reference image sections of a single reference image to calculate statistical information using reference image sections from a plurality of different reference images (e.g. dividing a plurality of references images into reference image sections, and processing the image sections appropriately). This enables a style to be transferred from a bank of reference images.

In previously described embodiments, the second statistical information is generated from a single input digital pathology image. However, in some embodiments, one could aggregate/average/calculate second statistical information from several input digital pathology images. This could be performed by adapting previously described methods for calculating second statistical information using image sections of a single input digital pathology image to calculate statistical information using reference image sections from a plurality of different reference images (e.g. dividing a plurality of input images into image sections, and processing the image sections appropriately). This helps enable consistency across a set of input images, e.g. those that have been obtained using a same or similar mechanism or staining technique.

Whilst preferred for the sake of consistency, in any above-described embodiment, it is not essential that the size of the reference image be identical to the size of the input digital pathology image.

Figure 5:
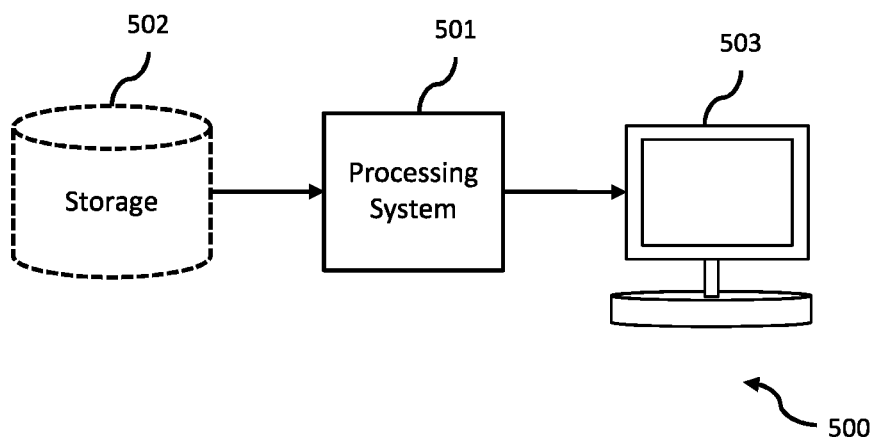
FIG. 5 is an image provision system according to an embodiment.

FIG. 5 illustrates an image provision system 500 according to an embodiment of the invention. The image provision system 500 comprises a processing system 501 for converting an input digital pathology image into an output image based on statistical information of a reference image. The processing system 501 is, by itself, an embodiment of the invention.

The processing system 501 is adapted obtain the input digital pathology image and to divide the input digital pathology image into two or more image sections. The processing system 501 may obtain the input image from a storage or database 502, which may form part of the overall image provision system 500.

The processing system 501 is also adapted to, for each image section: perform an encoding process, using a first convolutional neural network that generates one or more feature maps, each feature map being for a respective channel, on the image section to generate one or more feature maps for the image section; modify each feature map for the image section using statistical information derived from the reference image, wherein the statistical information represents the entire reference image; and perform a decoding process, using a second convolutional neural network, on the one or more modified feature maps to generate a modified image section; and generate an output digital pathology image using the modified two or more image sections.

The processing system 501 may be further adapted to display the output image at a user interface 503 of the image provision system 500. The user interface 503 may comprise, for example, a two-dimensional screen for displaying the output image. The user interface 503 may further be adapted to enable a user to select a input digital pathology image and/or a reference image that are to be used to generate the output digital pathology image.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. A non-transitory computer-readable storage medium storing instructions for carrying out, when executed by a processing system, a method of converting an input digital pathology image into an output digital pathology image based on statistical information of a reference image, the method comprising:
obtaining the input digital pathology image;
dividing the input digital pathology image into two or more image sections;
for each image section:
performing an encoding process, using a first convolutional neural network that generates one or more feature maps, each feature map being for a respective channel, on the image section to generate one or more feature maps for the image section;
modifying each feature map for the image section using statistical information derived from the reference image, wherein the statistical information represents the entire reference image; and
performing a decoding process, using a second convolutional neural network, on the one or more modified feature maps to generate a modified image section; and
generating an output digital pathology image using the modified two or more image sections, wherein:
the method further comprises obtaining second statistical information derived from the input digital pathology image and representing the entire input digital pathology image; and
the step of modifying each feature map comprises modifying the feature map further using the second statistical information.

2. The non-transitory computer-readable storage medium of claim 1, wherein the second statistical information comprises different statistical information for each respective channel.

3. The non-transitory computer-readable storage medium of claim 1, wherein the second statistical information is obtained by:
obtaining the input digital pathology image;
obtaining two or more image sections from the input digital pathology image;
performing an encoding process, using the first convolutional neural network, on each image section to generate one or more feature maps for each image section, each feature map being for a respective channel; and
generating statistical information for each channel using the feature maps, to thereby generate statistical information for the entire input digital pathology image.

4. The non-transitory computer-readable storage medium of claim 3, wherein the step of generating statistical information for each channel comprises performing a running statistical analysis process on feature maps of that channel to generate the statistical information.

5. The non-transitory computer-readable storage medium of claim 1, wherein the second statistical information comprises:
a mean and standard deviation, for each channel, representing the entire input digital pathology image; and/or
covariance and/or cross-correlation data, between different channels, representing the entire input digital pathology image.

6. The non-transitory computer-readable storage medium of claim 1, wherein the first convolutional neural network generates one or more feature maps that represent a style of the image section.

7. The non-transitory computer-readable storage medium of claim 1, wherein the second convolutional neural network is trained to reverse the encoding process performed by the first convolutional neural network.

8. The non-transitory computer-readable storage medium of claim 1, wherein the statistical information comprises different statistical information for each respective channel.

9. The non-transitory computer-readable storage medium of claim 1, wherein the statistical information comprises:
a mean and standard deviation, for each channel, derived from the reference image and representing the entire reference image; and/or
covariance and/or cross-correlation data, between different channels, derived from the reference image and representing the entire reference image.

10. The non-transitory computer-readable storage medium of claim 1, wherein the statistical information is derived by:
obtaining the reference image;
obtaining two or more reference image sections from the reference image;
performing an encoding process, using the first convolutional neural network, on each reference image section to generate one or more feature maps for each reference image section, each feature map being for a respective channel; and
generating statistical information for each channel, to thereby generate statistical information representing the reference image.

11. The non-transitory computer-readable storage medium of claim 10, wherein the step of generating statistical information for each channel comprises performing a running statistical analysis process on feature maps of the channel to generate the statistical information.

12. The non-transitory computer-readable storage medium of claim 1, wherein each image section and each feature map, for each image section, has at least a width and a height dimension, wherein:
the magnitude of the width dimension of each feature map is no less than a sixteenth of the magnitude of the width dimension of the image section corresponding to the feature map; and/or
the magnitude of the height dimension of each feature map is no less than a sixteenth of the magnitude of the height dimension of the image section corresponding to the feature map.

13. A computer-implemented method of converting an input digital pathology image into an output digital pathology image based on statistical information of a reference image, the computer-implemented method comprising:
obtaining the input digital pathology image;
dividing the input digital pathology image into two or more image sections;
for each image section:
performing an encoding process, using a first convolutional neural network that generates one or more feature maps, each feature map being for a respective channel, on the image section to generate one or more feature maps for the image section;
modifying each feature map for the image section using statistical information derived from the reference image, wherein the statistical information represents the entire reference image; and performing a decoding process, using a second convolutional neural network, on the one or more modified feature maps to generate a modified image section; and generating an output digital pathology image using the modified two or more image sections; wherein:

the computer-implemented method further comprises obtaining second statistical information derived from the input digital pathology image and representing the entire input digital pathology image; and the step of modifying each feature map comprises modifying the feature map further using the second statistical information.

14. A processing system for converting an input digital pathology image into an output digital pathology image based on statistical information of a reference image, the processing system being adapted to:

obtain the input digital pathology image;

divide the input digital pathology image into two or more image sections;

for each image section:

perform an encoding process, using a first convolutional neural network that generates one or more feature maps, each feature map being for a respective channel, on the image section to generate one or more feature maps for the image section;

modify each feature map for the image section using statistical information derived from the reference image, wherein the statistical information represents the entire reference image; and perform a decoding process, using a second convolutional neural network, on the one or more modified feature maps to generate a modified image section; and generate an output digital pathology image using the modified two or more image sections; wherein:

the processing system being further adapted to obtain a second statistical information derived from the input digital pathology image and representing the entire input digital pathology image; and to modify the feature map further using the second statistical information.

* * * * *